United States Patent
Duong et al.

(10) Patent No.: US 10,964,085 B2
(45) Date of Patent: *Mar. 30, 2021

(54) METHOD AND APPARATUS FOR INCITING A VIEWER TO ROTATE TOWARD A REFERENCE DIRECTION WHEN CONSUMING AN IMMERSIVE CONTENT ITEM

(71) Applicant: INTERDIGITAL CE PATENT HOLDINGS, Paris (FR)

(72) Inventors: Quang Khanh Ngoc Duong, Rennes (FR); Joel Sirot, Montreuil sur Ile (FR); Gwenaelle Marquant, La chapelle chausse (FR); Claire-Helene Demarty, Montreuil le Gast (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,098

(22) Filed: Jul. 8, 2020

(65) Prior Publication Data
US 2020/0342650 A1    Oct. 29, 2020

Related U.S. Application Data

(63) Continuation of application No. 16/004,069, filed on Jun. 6, 2018, now Pat. No. 10,748,321.

(30) Foreign Application Priority Data

Jun. 6, 2017 (EP) ..................... 17305660

(51) Int. Cl.
  *G06T 13/80* (2011.01)
  *G06F 3/01* (2006.01)

(52) U.S. Cl.
  CPC .............. *G06T 13/80* (2013.01); *G06F 3/011* (2013.01); *G06F 3/013* (2013.01); *G06T 2200/04* (2013.01)

(58) Field of Classification Search
  None
  See application file for complete search history.

(56) References Cited

U.S. PATENT DOCUMENTS 7,386,799 B1    6/2008   Clanton et al.
9,508,180 B2    11/2016  Shuster
(Continued)

FOREIGN PATENT DOCUMENTS

CN    105339867 A    2/2016
CN    106662925 A    5/2017
(Continued)

OTHER PUBLICATIONS

Danieau, F. et al, (2017). Attention guidance for immersive video content in head-mounted displays. In 2017 IEEE Virtual Reality (VR). Los Angeles, CA (2017).
(Continued)

*Primary Examiner* — Michelle Chin
(74) *Attorney, Agent, or Firm* — Invention Mine LLC

(57) ABSTRACT

The present disclosure relates to methods, apparatus or systems for inciting a user consuming an immersive content to rotate the immersive rendering device in the direction of a region of interest. According to the present principles, an object representative of a character is inserted in the field of view of the user. The character is computed in a way it looks in the direction of the region of interest from its location in the immersive content. In addition, face and body attitude of the character may reflect an emotion that is associated with the region of interest, for example scare, happiness or
(Continued)

interest. The user will naturally be incited at looking in the direction indicated by the inserted character.

15 Claims, 4 Drawing Sheets

(56) References Cited

U.S. PATENT DOCUMENTS

| | | |
|---|---|---|
| 9,672,948 B2 | 6/2017 | Singh |
| 2014/0375683 A1 | 12/2014 | Salter |
| 2015/0029223 A1 | 1/2015 | Kaino et al. |
| 2016/0055676 A1 | 2/2016 | Kasahara et al. |
| 2016/0284134 A1 | 9/2016 | Kamhi et al. |
| 2017/0026577 A1 | 1/2017 | You et al. |

FOREIGN PATENT DOCUMENTS

| | | |
|---|---|---|
| KR | 20150022079 A | 3/2015 |
| WO | 2014190221 A1 | 11/2014 |
| WO | 2016014871 A1 | 1/2016 |

OTHER PUBLICATIONS

Renner, P., et al, "Attention guiding techniques using peripheral vision and eye tracking for feedback in augmented-reality-based assistance systems." In 2017 IEEE Symposium on 3D User Interfaces (3DUI), pp. 186-194. IEEE, 2017.

METHOD AND APPARATUS FOR INCITING A VIEWER TO ROTATE TOWARD A REFERENCE DIRECTION WHEN CONSUMING AN IMMERSIVE CONTENT ITEM

CROSS-REFERENCE TO RELATED APPLICATIONS

The present application is a continuation of U.S. patent application Ser. No. 16/001,069, entitled "METHOD AND APPARATUS FOR INCITING A VIEWER TO ROTATE TOWARD A REFERENCE DIRECTION WHEN CONSUMING AN IMMERSIVE CONTENT ITEM" and filed Jun. 6, 2018, which claims priority from European Patent Application No. 17305660.7, entitled "METHOD AND APPARATUS FOR INCITING A VIEWER TO ROTATE TOWARD A REFERENCE DIRECTION WHEN CONSUMING AN IMMERSIVE CONTENT ITEM" and filed Jun. 6, 2017, each of which is hereby incorporated by reference in its respective entirety.

TECHNICAL FIELD

The present disclosure relates to the domain of inciting a user consuming an immersive content to look in a direction of interest, for instance with a head mounted displays (HMD) or a TV set or a mobile device such as a tablet or a smartphone.

BACKGROUND

An immersive content item is a content item that is made to be displayed around a user, so that the user has the feeling to be in the middle of the content. Immersive content may be a three-dimensional computer graphic imagery content (3D CGI), a volumetric video or a video mapped to a three-dimensional convex surface such as a sphere, a cube or a cylinder. Besides, a large two-dimension image of which the user could only see a part, by the means of a cropping for example, is also an immersive content; the user has to control the rendering device in order to see a not actually displayed part of the content.

Immersive content items are rendered by immersive rendering devices. For example, Head-Mounted Displays (HMD) are display devices, worn on the head or as part of a helmet, that have a small display optic in front of one eye (monocular HMD) or each eye (binocular HMD). They are advantageously adapted to consume immersive content items. In such a device, only a part of the video is displayed. The displayed part of the video content is updated according to the user head pose by the mean of an integrated Motion Unit Measurement (including a gyroscope) for instance and/or a pose estimating system using, for instance, cameras. A smartphone or a tablet may also render an immersive content. The displayed part is updated according to the orientation, and eventually according to the location, of the device.

The advent of such devices allows the user to watch a 4π steradians content by the means of movements, for instance head rotations. If such a feature may appear as a real improvement in terms of immersion in the content, as the user is watching at only a part of the content, he may not look at the direction he should look at a given moment. Indeed, as the user can gaze all around him, he may miss some important highlights of the narration because he is watching at another part of the content at the moment the narrative event happens.

According to the background art, it is known that forcing a virtual camera panning in order to make the user look toward the direction he has to look to, is a very efficient solution. However, it is well known that this solution has the drawback to make users sick and, as a consequence, to deteriorate the user's quality of experience. Pseudo-haptics methods degrading the content in the direction to avoid are known. They have the drawback to degrade the rendered images and so to modify the author's work and to alter the user's experience. Methods controlling a discrepancy between the aiming direction of the device controlled by the user's movement and the aiming direction of a virtual camera capturing the part of the scene to render are also an existing solution. They have the drawback of limiting the possible direction in which the user can look to.

There is a lack for a solution that friendly incites a user to look toward a direction (or a region) of interest without limiting his freedom of not following the incitement and without degrading his viewing experience.

SUMMARY

The present disclosure relates to a method of encouraging a user to look toward a reference direction within an immersive content without limiting his freedom of not following the incitement and without degrading his viewing experience. According to the present principles, a friendly character is inserted, at the immersive rendering device, in the field of view of the user. When the user is looking in a reference direction (for instance a direction of interest), the character looks toward the user or turn its back to the user for example and has a neutral expression. In a variant, the character is not displayed when the user looks toward the reference direction. In another variant, the size of the character is modified, for example decreased, and it may be rendered in a corner of the screen. The character may also close its eyes. When something happens and the reference direction is out of the field of view of the user, the character looks in a direction that indicates to the user the reference direction. The character may change is face expression, for example to look afraid or surprised according to the type of an event happening in the content, so the user is incited to look where the character is gazing at. In a variant, the character has a body expression that reinforces the incitement effect.

The present disclosure relates to a method of rendering an immersive content by a rendering device. The method comprises:

obtaining a reference direction of interest within the immersive content and an emotion data associated with said reference direction;

inserting an object representative of a character having at least one eye at a location within the immersive content, the location being encompassed in a part of the immersive content being rendered by the rendering device; and wherein, gaze direction of the at least one eye of the object is determined according to the location and the reference direction and wherein the object is determined to reflect the emotion data.

According to an aspect of the present principles, the gaze direction is computed to make the character look in the direction of the reference direction from the location of the object within the immersive content.

In an embodiment, an emotion data is associated with the reference direction and the face of the character is animated to be representative of this emotion.

According to another aspect of the present principles, the character comprises body parts in addition to its head, which are animated in order to reinforce the indication of the gaze direction.

In an embodiment, the location of the object is calculated according to a screen space location and size of the projection of the object in the first part of the immersive content that is displayed.

According to another aspect of the present principles, the reference direction is obtained from a data stream encoding the immersive content.

In an embodiment, the reference direction is obtained by analysing the immersive content to detect regions of interest and the reference direction is a vector starting from the location of the viewer in the immersive content pointing to a region of interest.

The present disclosure also relates to a rendering device comprising a memory associated with at least one processor configured to:

obtain a reference direction of interest within the immersive content and an emotion data associated with said reference direction;

insert an object representative of a character having at least one eye at a location within the immersive content, the location being encompassed in a part of the immersive content being rendered by the rendering device; and wherein, gaze direction of the at least one eye of the object is determined according to the location and the reference direction and wherein the object is determined to reflect the emotion data.

BRIEF DESCRIPTION OF THE DRAWINGS

The present disclosure will be better understood, and other specific features and advantages will emerge upon reading the following description, the description making reference to the annexed drawings wherein.

DETAILED DESCRIPTION

Figure 1:
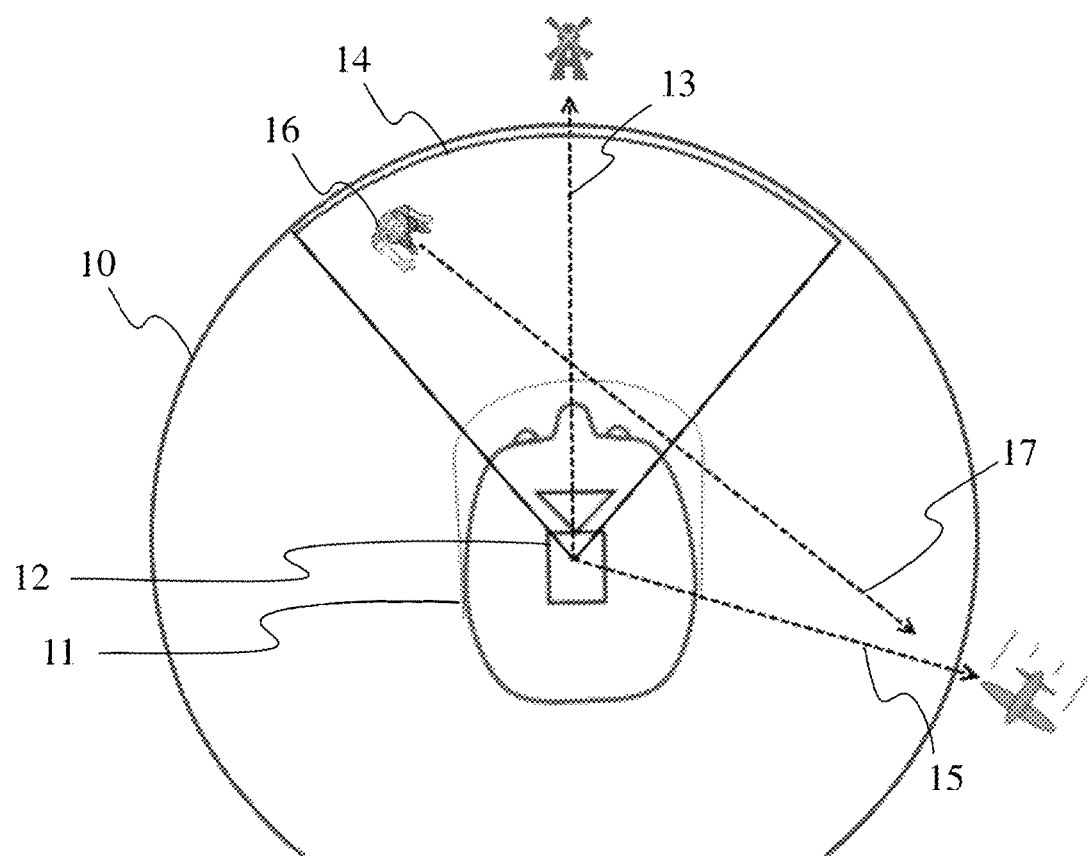
FIG. 1 illustrates an example of a user consuming an immersive content item rendered by an immersive rendering device, for example a HMD wore on the head, according to a specific embodiment of the present principles.

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

For the sake of clarity, FIGS. 1, 2A, 2B and 2C illustrate examples in two dimensions and refer to the only "yaw" angle (i.e. a rotation around the Z-axis). It is understood that the present principles are extendable to a third dimension and to the "pitch" angle (i.e. a rotation around the Y-axis) and to the "roll" angle (i.e. a rotation around the X-axis).

FIG. 1 illustrates an example of a user 11 consuming an immersive content item rendered by an immersive rendering device, for example a HMD wore on the head. For example, a virtual camera 12 is capturing images of a part 14 of the immersive content 10 which are displayed on the at least one screen of the HMD. In the case of a HMD, one image is rendered in front of each eye of the user. This may be the same image (i.e. mono-rendering) or two different images (i.e. stereo-rendering). The immersive content may be a three-dimensional computer graphics imagery scene (3D CGI scene) in which 3D models of objects are positioned in a frame of reference. In another embodiment, the immersive content may be a video mapped on a three-dimensional convex surface (e.g. a sphere, a cylinder, a cube, a pyramid or a part of these 3D shapes). The user controls the displayed part 14 of the immersive content 10 by moving the immersive rendering device, for instance by rotating his head in the example of a HMD. The user is looking in a direction 13, for example looking at the mills of FIG. 1. The displayed part 14 is determined by the immersive rendering device according to the direction 13 and the hardware configuration of the device defining the field of view (e.g. lenses of the HMD and/or width of screens).

According to the present principles, a reference direction 15 is obtained. Reference direction 15 may be obtained by analyzing the immersive content to detect a point, an object or a region of interest within the content, the reference direction 15 being computed according to the relative location of the virtual camera and of the region of interest (a point is a unitary region and an object, as a part of the content, can be seen as defining a region within the content). Existing region detection algorithms may be used according to the type of immersive content. For example, if the immersive content is an immersive video, region of interest detection algorithms based on saliency or on intra-interestingness may be used. In another embodiment, reference direction may be obtained from the data stream encoding the immersive content item, for instance as metadata synchronized with the rendering of the immersive content. In a third embodiment, reference direction 15 is obtained from another source than the data stream encoding the immersive content item, for example reference direction 15 is received from a remote device (e.g. a HTTP server or a broadcast server) or read in a memory associated with the immersive rendering device or with a device associated with the immersive rendering device.

For example, reference direction 15 is a direction of interest, for example because a narrative event happens in this direction. According to the event a data representative of an emotion may be associated to reference direction 15, for example "frightening" or "joyful" or "boring". This emotion may be determined by using algorithms analysing emotions in the immersive content and, in particular, emotions related to the region of interest. In another embodiment, the emotion data is retrieved from the data stream encoding the immersive content item. Direction 15 may be obtained at the instant the event happens. In a variant, direction 15 is obtained some time before the event happens, for example one second or three seconds before.

According to the present principles, an object 16 representative of a character is inserted within the immersive content at least when a direction 15 is obtained. Object 16 is inserted at a location in the frame of reference of the immersive content so it is encompassed in the field of view of the user defined according to direction 13; In other words, object 16 is comprised in the displayed image of part 14 of the immersive content. Object 13 is computed according to direction 13, direction 15 and the location of object 13 in part 14 of the immersive. The character has at least one eye and its gaze direction 17 is computed so the character is looking toward the direction of interest when rendered at its location in the immersive content 10. In a variant, the head direction of the character is computed so the character is heading toward the gaze direction. Indeed, the gaze direction of the character is modified when the head is rotating in the frame of reference of the scene, even if the eyes are not animated in the frame of reference of the head. In another variant, the character is computed to have a face expression that is related to the emotion data associated with reference direction. For example, for an emotion data "surprising", the character's eyes are wide open. In a variant, the character has a body attitude that reinforce the inciting effect of its gaze. For example, the character may point the gaze direction 17 with its arm or fingers to incite the user to look in direction 15. If gaze direction 17 points behind the user, the character may reach up or tilt its head to look over the user's shoulder. This aspect of the present principles is further detailed in reference to FIGS. 2A, 2B and 2C.

Object 16 is representative of a character and is computed, at least when a reference direction 15 is obtained, according to a location in the frame of reference of the immersive content and a gaze direction 17. In a variant, an emotion data associated with reference direction 15 is used to compute object 16. The computing of object 16 may be based on 3D model animation techniques. An animable 3D model of the character is stored in a memory associated with the immersive rendering device. The eyes of the model are oriented according to gaze direction 17. In a variant, the animable 3D model of the character comprises other body parts which may be animated according to gaze direction 17. In a variant, emotion data associated with reference direction 15. For example, the face of the animable 3D model may be animated to express a sentiment reflecting the emotion data. Animation techniques are well-known. For example, mesh interpolation between key meshes is commonly used to provide a face 3D model a gradable expression of a sentiment. In another embodiment, object 16 is a textured billboard (i.e. a rectangle imager always oriented toward the virtual camera). The computing of the billboard texture is based on 2D animation techniques according to similar principles than 3D animation techniques. In a third embodiment, object 16 is selected in a set of predetermined objects according to a location in the frame of reference of the immersive content and a gaze direction 17 and, in a variant, according to the emotion data associated with direction 15.

Figure 2A:
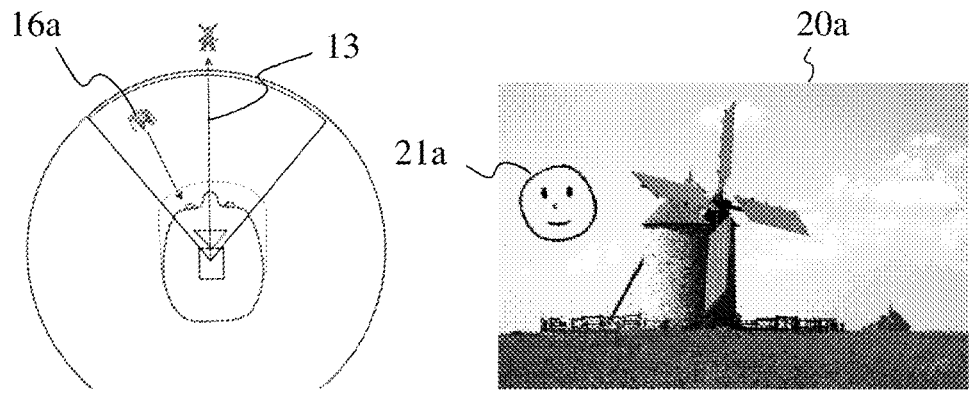
FIG. 2A shows the user of FIG. 1 consuming an immersive content item rendered before a reference direction is obtained, according to a specific embodiment of the present principles.
Figure 2B:
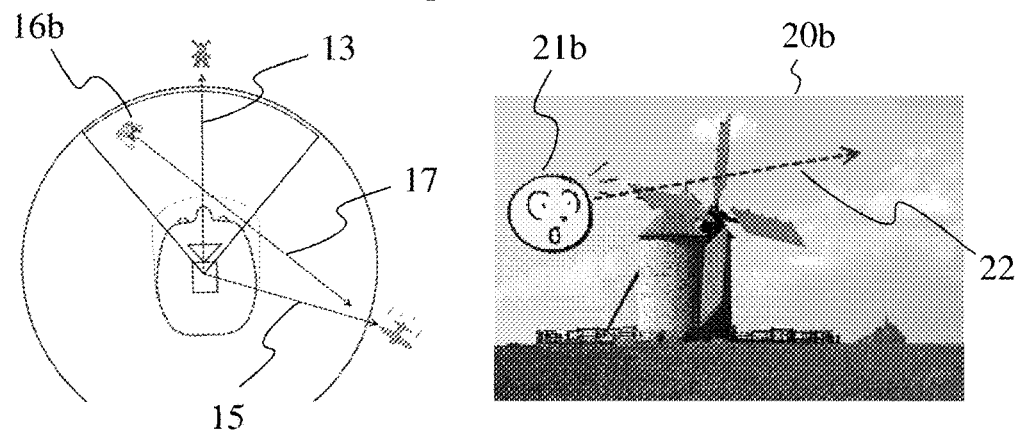
FIG. 2B shows the user of FIG. 1 consuming an immersive content item rendered at the time a reference direction is obtained, according to a specific embodiment of the present principles.
Figure 2C:
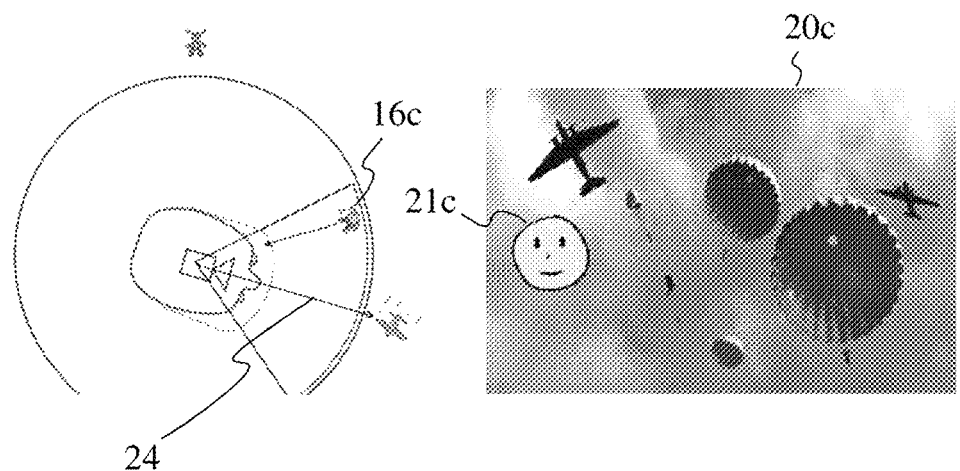
FIG. 2C shows the user of FIG. 1 consuming an immersive content item rendered by an immersive rendering device when the user has rotated his head as incited by the character of FIG. 2B, according to a specific embodiment of the present principles.

FIG. 2A shows the user 11 of FIG. 1 consuming an immersive content item rendered by an immersive rendering device before a reference direction is obtained. The user is looking in a direction 13 that defines a part 14 of the immersive content. An image 20a corresponding to part 14 is displayed on the at least one screen of the immersive rendering device. No reference direction is obtained at this moment. According to the present principles, an object 16a is inserted in the immersive content at a scene space location encompassed in the field of view of the user. This scene space location is relative to the screen space location and size that an image 21a of the character will be rendered at. Screen space location and size of the image 21a may be computed on the basis of the scene space location and size of object 16a. Reciprocally, in order to optimize the place that the character will occupy on the screen, location and size of object 16a may be computed according to first computed location and size of image 21a. An example method is to minimize the overlapping of meaningful parts of displayed images. In the example of FIGS. 2A, 2B and 2C, the place of image 21a, 21b and 21c is chosen to appear on the sky. As displayed images are generated according to direction 13 that is controlled by the user, screen space location and size of the character image may vary over time. It is however preferred not to make it vary a lot and not to make the image 21a pop from one location to another one as explained below. Another example method is to compute screen space location and size of image 21a according to the upcoming obtaining of a reference direction 15 and an estimated upcoming direction 17 as explained in reference to FIG. 2B.

FIG. 2B shows the user 11 of FIG. 1 consuming an immersive content item rendered by an immersive rendering device at the time a reference direction is obtained. Reference direction 15 is obtained at the instant a content event happens. In a variant, reference direction 15 is obtained some time before a content event happens, for example half a second or two seconds before. According to the present principles, object 16a of figure is modified to become object 16b. In a variant, object 16a is replaced by object 16b (i.e. object 16a is removed from the immersive content and object 16b is inserted in the immersive content). Object 16b is computed according to gaze direction 17 determined according to the scene space location of object 16b and reference direction 15. In a variant, an emotion data is associated with reference direction 15 and is used to compute object 16b. In FIG. 2B, the character looks surprised by an event in direction 22, at the viewer's right, behind and upper him.

An example effect of the sudden modification of image 21a in image 21b is to draw the viewer's attention at the character. A natural reaction would lead the viewer to rotate his head to look in the same direction 22. However, this incitement is not peremptory and the viewer may decide to ignore it. In a variant, the arrow 22 is effectively draw on image 20b to reinforce the incitement effect.

It is preferred that images 21a, 21b and 21c does not pop from one screen space location to another (but if it is associated to the sudden modification of reference direction 15), as it would draw the viewer's attention to a non-event and disturb his viewing experience quality. The screen space location of image 21b may be determined according to gaze direction 17 and 22. For example the object may be located at a side of the screen space so its gaze crosses the screen as in FIG. 2B. In a variant, the image of the character may progressively move across the screen space to go toward the gaze direction or to run away in the opposite direction according, for example to the emotion data associated with the reference direction.

Several reference directions may be obtained at the same time. In such a case, the gaze direction may be computed according to one of these directions, for instance according to an importance score associated with each reference direction or according to the emotion data associated with each of them. Several objects representative each of a character may be computed and inserted in the immersive content.

FIG. 2C shows the user 11 of FIG. 1 consuming an immersive content item rendered by an immersive rendering device when the user has rotated his head in direction 23 of FIG. 2B. The incitement effect of FIG. 2B leads the viewer to rotates is head toward direction 21 and a part of the immersive content relative to gaze direction 17 is displayed. Reference direction 15 is ignored because it is encompassed in the viewer's field of view and object 16c is computed so the character looks in the direction of the user, for example, with a neutral expression. In a variant object 16c is removed from the immersive content, so no image 21c is displayed on screens.

Figure 3:
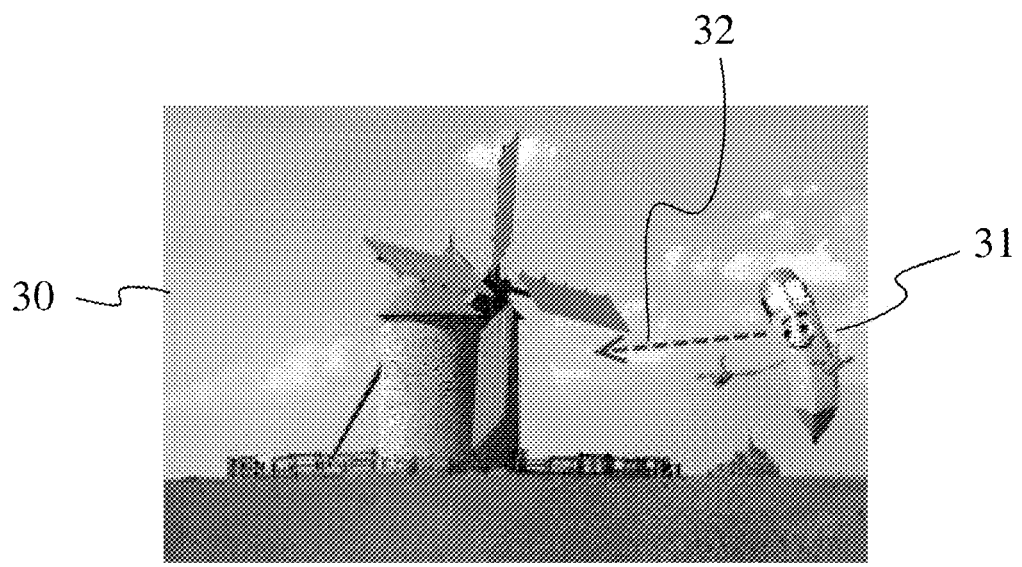
FIG. 3 illustrates a displayed image as the image of FIG. 2B with a character which comprises a body and arms, according to a specific embodiment of the present principles.
Figure 4:
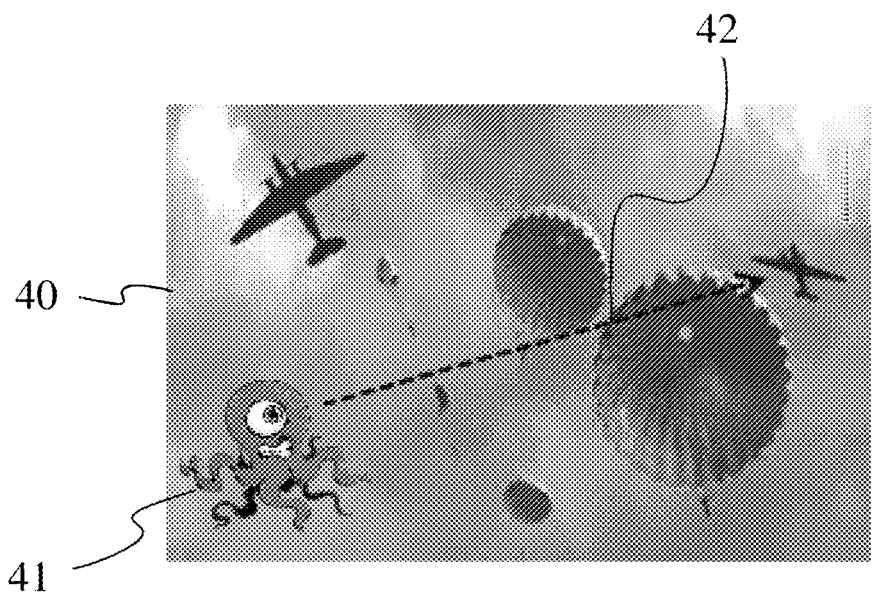
FIG. 4 illustrates a displayed image as the image of FIG. 3 with a character which comprises only one eye, according to a specific embodiment of the present principles.

In another embodiment, reference direction 15 is not ignored and gaze direction 17 is computed as explained in reference to FIGS. 3 and 4.

FIG. 3 illustrates a displayed image 30 as the image 20b of FIG. 2B with a character which comprises a body and arms. In this example, the object representative of a character is computed in order to incite the viewer to focus on a reference direction 15 that is encompassed within the viewer's field of view, here, the mills, for instance because the reference direction is associated with an emotion data "interesting". Gaze direction 32 is calculated according to reference direction and a scene space location of object 16 of FIG. 1. The character may have a body which may be configured and animated to reinforce the incitement effect to look in the reference direction. In the example of FIG. 3, the pencil character bends towards the mills and points its arms and fingers toward the interesting object at the reference direction.

Data used to compute the object representative of a character according to reference direction are stored in a memory associated with the immersive rendering device. In another embodiment, these data are stored in a memory associated with a remote device and requested when needed by the immersive rendering device. The character may be selected according to user preferences. The character may be draw as a carton or may be photorealistic. The character may be generated according to picture of a human person, for example a friend or relative of the user or the user himself.

FIG. 4 illustrates a displayed image 40 as the image 30 of FIG. 3 with a character which comprises only one eye. The gaze direction 42 and the frightened attitude of the displayed character 41 naturally and friendly incite the user to focus on the second plane that will soon leave the field of view and is estimated more important to follow than the first plane or the parachutists. The one eye gaze of the character will progressively follow the second plane inciting the viewer to do the same.

Figure 5:
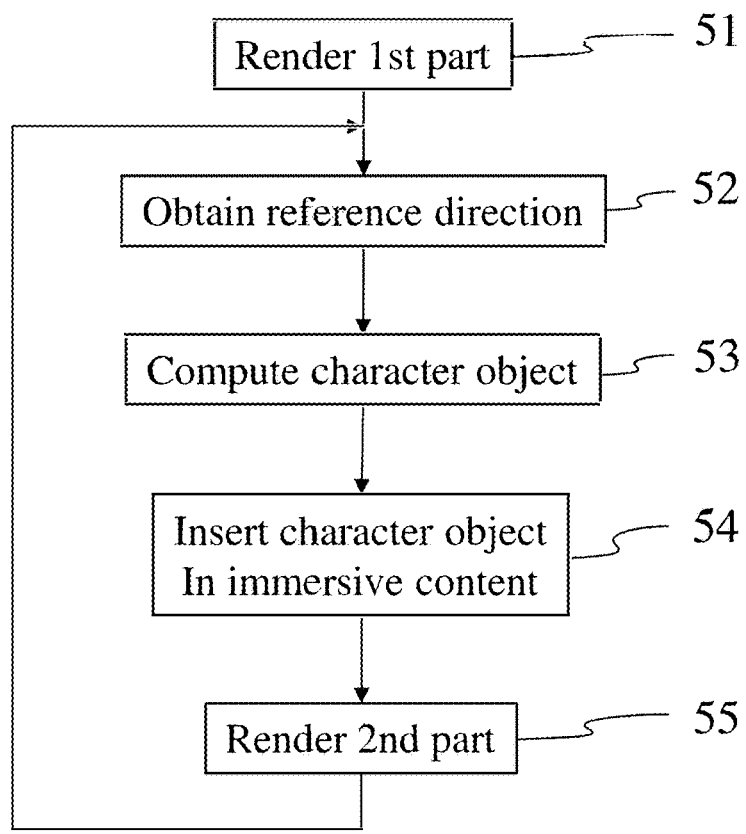
FIG. 5 diagrammatically shows an embodiment of a method as implemented in a processing device such as the device of FIG. 6 according to a non-restrictive advantageous embodiment.
Figure 6:
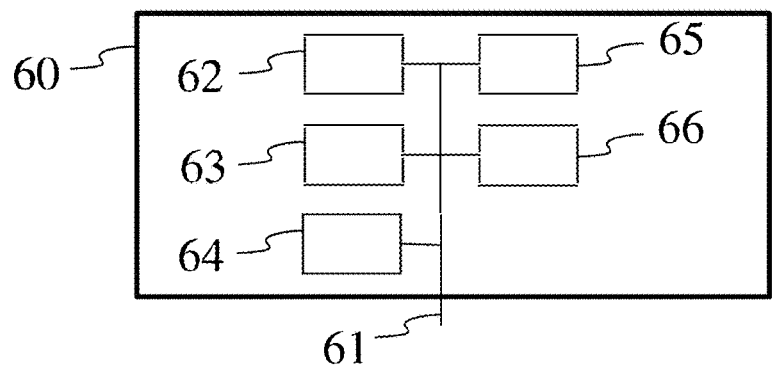
FIG. 6 shows an exemplary architecture of a device which may be configured to implement a method described in relation with FIG. 5, according to a specific embodiment of the present principles.

FIG. 5 diagrammatically shows an embodiment of a method 50 as implemented in a processing device such as the device 60 of FIG. 6 according to a non-restrictive advantageous embodiment.

In an initialization step 51, an immersive rendering device 60 of FIG. 6 obtains a data stream encoding an immersive content item and renders a first part of the immersive content according to a direction of immersive rendering device 60.

In a step 52, a reference direction is obtained. The reference direction may point to a region of interest in the immersive content from the location of the viewer within the immersive content. An emotion data may be associated to the reference direction. The reference direction may be obtained by analysing the immersive content with region of interest detection algorithms. Emotion data may be determined by scene analysis algorithms. In another embodiment, reference direction information may be extracted from synchronized data encoded in the data stream of the immersive content item. Emotion data may also be retrieved from these synchronized data. Synchronized data may have been automatically generated or they may have been determined by a human operator.

In a step 53, an object representative of a character is computed according to obtained reference direction. A gaze direction for the character is computed according to the reference direction and a location of the object in the immersive content. The location of the object may be calculated according to a screen space location and a screen space size an image of the character will have when displayed. The object is computed so the character at least one eye is looking in the computed gaze direction. In a variant, the character has body parts (e.g. torso, arms, fingers, etc.) including the head, which are animated to reinforce the incitement effect of looking in the gaze direction, toward the reference direction. In another variant, the emotion data associated with the reference direction is used to animate the character in a way it expresses a related sentiment.

In a step 54, the computed object representative of the character is inserted in the immersive content. The immersive rendering device computes the image to display according to the direction the user is looking in. As the object is located to be within the field of view of the user, the image of the character is displayed with the part of the immersive content corresponding to the user's looking direction. In another embodiment, the projection of the object representative of the character in the screen space is first processed as an image. Second, the character image is overlaid on the displayed part of the immersive content.

In step 55, as a consequence of the sudden modification of the image of the character, the user is incited to rotate the device in the direction indicated by the gaze direction. A second part of the immersive content corresponding to this new user's looking direction is rendered by the immersive rendering device.

FIG. 6 shows an exemplary architecture of a device 60 which may be configured to implement a method described in relation with FIG. 5.

The device 60 comprises following elements that are linked together by a data and address bus 61:
- a microprocessor 62 (or CPU), which is, for example, a DSP (or Digital Signal Processor);
- a ROM (or Read Only Memory) 63;
- a RAM (or Random Access Memory) 64;
- a storage interface 65;
- an I/O interface 66 for reception of data to transmit, from an application; and
- a power supply, e.g. a battery.

In accordance with an example, the power supply is external to the device. In each of mentioned memory, the word «register» used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with present principles. When switched on, the CPU 62 uploads the program in the RAM and executes the corresponding instructions.

The RAM 64 comprises, in a register, the program executed by the CPU 62 and uploaded after switch on of the device 60, input data in a register, intermediate data in different states of the method in a register, and other variables used for the execution of the method in a register.

In accordance with the method of FIG. 5, a data stream encoding an immersive content item is obtained from a source. For example, the source belongs to a set comprising:

a local memory (63 or 64), e.g. a video memory or a RAM (or Random Access Memory), a flash memory, a ROM (or Read Only Memory), a hard disk;

a storage interface (65), e.g. an interface with a mass storage, a RAM, a flash memory, a ROM, an optical disc or a magnetic support;

a communication interface (66), e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

In accordance with examples, the device 60 is configured to implement a method described in relation with FIG. 5, and belongs to a set comprising:

a mobile device;

a communication device;

a game device;

a tablet (or tablet computer);

Naturally, the present disclosure is not limited to the embodiments previously described. In particular, the present disclosure is not limited to a method of rendering an immersive content by inserting an object representative of a character but also extends to processing at least one objects representative of characters, for example talking characters which would incite the viewer to look in a given direction or toward regions of interest with dialogue. The implementation of calculations necessary to compute the at least one object representative each of a character are not limited to an implementation in a CPU but also extends to an implementation in any program type, for example programs that can be executed by a GPU type microprocessor.

The implementations described herein may be implemented in, for example, a method or a process, an apparatus, a software program, a data stream or a signal. Even if only discussed in the context of a single form of implementation (for example, discussed only as a method or an apparatus), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, smartphones, tablets, computers, mobile phones, portable/personal digital assistants ("PDAs"), and other devices.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of rendering an immersive content from a point of view by a rendering device, the method comprising:

inserting an object representative of a character having at least one eye at a location within the immersive content, the location being encompassed in a part of the immersive content being rendered by the rendering device from the point of view, wherein a gaze direction of at least one eye of the object is determined to make the character look from the location in the rendered part of the immersive content in an obtained reference direction from the point of view within the immersive content.

2. The method of claim 1, wherein the object is animated to reflect an emotion corresponding to received emotion data.

3. The method of claim 1, wherein the character comprises body parts, the body parts being animated to reinforce the indication of the gaze direction.

4. The method of claim 1, wherein the location is determined according to a screen space location and a screen space size of a projection of the object in the rendered part of the immersive content.

5. The method of claim 1, wherein the reference direction is obtained from a data stream encoding the immersive content.

6. The method of claim 1, wherein the reference direction is obtained by analyzing the immersive content to detect regions of interest.

7. The method of claim 1, wherein the reference direction is obtained before an event happens in the immersive content.

8. The method of claim 1, wherein the gaze direction is determined after inserting the object.

9. A rendering device configured to render an immersive content from a point of view, comprising:

a memory; and at least one processor configured to:

insert an object representative of a character having at least one eye at a location within the immersive content, the location being encompassed in a part of the immersive content being rendered by the rendering device from the point of view; and determine a gaze direction of at least one eye of the object to make the character look from the location in the rendered part of the immersive content in an obtained reference direction from the point of view within the immersive content.

10. The rendering device of claim 9, wherein the at least one processor is configured to animate the object to reflect an emotion corresponding to received emotion data.

11. The rendering device of claim 9, wherein the character comprises body parts and wherein the at least one processor is configured to animate the body parts to reinforce the indication of the gaze direction.

12. The rendering device of claim 9, wherein the at least one processor is configured to determine the location according to a screen space location and a screen space size of a projection of the object in the rendered part of the immersive content.

13. The rendering device of claim 9, wherein the at least one processor is configured to obtain the reference direction from a data stream encoding the immersive content.

14. The rendering device of claim 9, wherein the at least one processor is configured to obtain the reference direction by analyzing the immersive content to detect regions of interest.

15. A non-transitory computer storage medium having stored thereon program code instructions operative, when the program is executed by at least one processor, to:

insert an object representative of a character having at least one eye at a location within the immersive content, the location being encompassed in a part of the immersive content being rendered by the rendering device from the point of view, wherein a gaze direction of at least one eye of the object is determined to make the character look from the location in the rendered part of the immersive content in an obtained reference direction from the point of view within the immersive content.

* * * * *